United States Patent
Delgado et al.

(10) Patent No.: US 10,130,886 B2
(45) Date of Patent: Nov. 20, 2018

(54) CONTROLLING A USER INTERFACE OF A COMPUTER DEVICE

(71) Applicant: KING.COM LIMITED, St. Julians, MT (US)

(72) Inventors: Tatiana Delgado, Barcelona (ES); Andrey Torchinskiy, Barcelona (ES); Eugene Ong, Barcelona (ES)

(73) Assignee: KING.COM LTD., St. Julians (MT)

( * ) Notice: Subject to any disclaimer, the term of this patent is extended or adjusted under 35 U.S.C. 154(b) by 31 days.

(21) Appl. No.: 15/013,465

(22) Filed: Feb. 2, 2016

(65) Prior Publication Data
US 2017/0216724 A1    Aug. 3, 2017

(51) Int. Cl.
*A63F 13/00* (2014.01)
*A63F 13/537* (2014.01)
*A63F 13/46* (2014.01)

(52) U.S. Cl.
CPC ............ *A63F 13/537* (2014.09); *A63F 13/46* (2014.09)

(58) Field of Classification Search
CPC ................................ A63F 13/537; A63F 13/46
USPC ........................................................ 463/31
See application file for complete search history.

(56) References Cited

U.S. PATENT DOCUMENTS

| | | | | |
|---|---|---|---|---|
| 9,399,168 | B2* | 7/2016 | Knutsson | A63F 13/12 |
| 2004/0048646 | A1* | 3/2004 | Visocnik | G07F 17/32 463/16 |
| 2014/0080600 | A1* | 3/2014 | Knutsson | A63F 13/12 463/31 |
| 2014/0235338 | A1* | 8/2014 | Hansson | G07F 17/32 463/31 |

OTHER PUBLICATIONS

Tobbpitt, "Candy Crush Soda Saga—Special Candy and Combos Guide", published Jan. 16, 2013 and retrieved via wayback machine on Jun. 25, 2017 from Internet URL <http://web.archive.org/web/20150116014153/https://www.gameskinny.com/1c0lw/candy-crush-soda-saga-special-candy-and-combos-guide>.*
GameGuidesToHelp, "Candy Crush Saga—Giant Candy|Wrapped Candy + Striped Candy", Youtube, Jul. 2, 2013 retrieved from Internet on Jun. 25, 2017 from URL<https://www.youtube.com/watch?v=gtn4h0sq24g>.*

* cited by examiner

*Primary Examiner* — Jay Liddle
*Assistant Examiner* — Ryan Hsu
(74) *Attorney, Agent, or Firm* — Saul Ewing Arnstein & Lehr LLP

(57) ABSTRACT

A computer device has a user interface which displays user actuatable game elements. User input is received and used to determine if there is a match involving three or more game elements. If so a check is made to see if one of the game elements is of a particular type. If so the size of the particular game element is determined to see if it is the smallest size. If not at least two further game elements of the given type are provided with a smaller graphical representation as compared to the at least one game element of the given type in the match game condition.

19 Claims, 13 Drawing Sheets

CONTROLLING A USER INTERFACE OF A COMPUTER DEVICE

FIELD OF THE INVENTION

The present invention relates to controlling a user interface responsive to user engagement with displayed elements on the interface of a computer device. The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. This may mean a small screen and/or limited processing capacity and/or limited memory and/or limited power.

Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of matching game where the player manipulates game objects according to a matching criterion.

A match-three game is a type of casual puzzle game where the player is required to find patterns. The player then has to match three or more of the same type of game and those matched elements will then disappear. An existing type of match-three game is a so-called "switcher" game. In a switcher game, the player switches place onto adjacent game elements on a game board so that one or both of them create a chain of at least three adjacent game elements of the same type. Those matched game elements will then disappear. The game area is then repopulated with game objects.

One such known match three-type game is known by the trade name Candy Crush. In that game, a game board is repopulated with game elements which are perceived as falling downwards onto the game board from the top edge of the screen from which the game is played.

Another known type of game is "linker game", where a sequence of game elements are linked to form a known sequence.

Another type of game is a 'clicker' game, in which matches can be made in a game area by clicking adjacent game elements.

A technical challenge exists when introducing complexity into such match games.

This patent specification describes not only various ideas and functions, but also their creative expression. A portion of the disclosure of this patent document therefore contains material to which a claim for copyright is made and notice is hereby given: Copyright King.com Limited 2016 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

Aspects may provide improved methods of controlling a user interface in the context of a computer-implemented game of a matching type (switcher, clicker or linker). Some aspects may provide a solution to the technical problem of improved user engagement by providing a new user engagement mode, which is implemented by a processor and data structure in a computer device.

According to an aspect, there is provided a computer device having: a user interface configured to display user actuatable game elements and to detect user input when a user selects a game element; at least one processor configured to receive the detected user input and on detecting a match game condition associated with a plurality of game elements to control the user interface to remove the match condition game elements from the display; and a graphics rendering component operable to render the game elements on the user interface, each game element having a graphical representation, wherein the processor is configured to determine if at least one of the match condition game elements in the match game condition is of a given type and if so to provide at least two further game elements of the given type, the graphics rendering component configured to provide the two further game elements with a smaller graphical representation as compared to the at least one game element of the given type in the match game condition.

The at least one processor may be configured to determine a match condition if the match condition game elements have at least one characteristic in common.

The at least one processor may be configured to provide the two further game elements with a different characteristic to a characteristic of the at least one game element of the given type in the match game condition.

The at least one processor may be configured to provide the two further game elements with a different characteristic to each other.

The at least one processor may be configured select for each of the further game elements an associated game element displayed on the interface and to control a respective further element to be positioned adjacent the respective associated game element.

The at least one processor may be configured to select for each of the further game elements an associated game element displayed on the interface and to control a respective further game element to have the same characteristic as the respective associated game element.

The computer device may comprise a memory configured to store size information associated with each game element of a given type, the size information comprising one of a plurality of different sizes.

The size information may comprise one of three different sizes.

The at least one processor may be configured to determine a size of at least one game element of the given type in the match game condition and if the size is a smallest size, no further game elements of the given type are provided in response thereto.

According to another aspect, there is provided a computer implemented method of controlling a user interface responsive to user engagement with displayed game elements on an interface, the method comprising the following steps implemented by a processor of a computer device: displaying user actuatable game elements; detecting user input when a user selects one or more game elements; detecting a match game condition associated with a plurality of game elements and causing the match condition game elements to be removed from the displayed game elements; rendering the game elements on the user interface, each game element having a graphical representation; and determining if at least one of the match condition game elements in the match game condition is of a given type, if so to providing at least two further game elements of the given type and displaying the two further game elements with a smaller graphical representation as compared to the at least one game element of the given type in the match game condition.

The method may comprise determining a match condition if the match condition game elements have at least one characteristic in common.

The method may comprise providing the two further game elements with a different characteristic to a characteristic of the at least one game element of the given type in the match game condition.

The method may comprise providing the two further game elements with a different characteristic to each other.

The method may comprise selecting for each of the further game elements an associated game element displayed on the interface and controlling a respective further element to be positioned adjacent the respective associated game element.

The method may comprise selecting for each of the further game elements an associated game element displayed on the interface and controlling a respective further game element to have the same characteristic as the respective associated game element.

The method may comprise storing size information associated with each game element of a given type, the size information comprising one of a plurality of different sizes.

The size information may comprise one of three different sizes.

The method may comprise determining a size of at least one game element of the given type in the match game condition and if the size is a smallest size, providing no further game elements of the given type in response thereto.

According to another aspect, there is provided a computer program product for controlling a user interface responsive to user engagement with displayed game elements on an interface of a computer device, the computer program product comprising code embodied on a computer-readable medium and being configured so as when executed on a processor of the computer to: display user actuatable game elements; detect user input when a user selects one or more game elements; detect a match game condition associated with a plurality of game elements and causing the match condition game elements to be removed from the displayed game elements; render the game elements on the user interface, each game element having a graphical representation; and determine if at least one of the match condition game elements in the match game condition is of a given type, if so to provide at least two further game elements of the given type and display the two further game elements with a smaller graphical representation as compared to the at least one game element of the given type in the match game condition.

According to an aspect, there is provided a computer device having: a user interface configured to display user actuatable game elements and to detect user input when a user selects a game element, at least one game element have one of a plurality of different characteristics; at least one processor configured to receive the detected user input and on detecting a match game condition associated with a plurality of game elements to control the user interface to remove the match condition game elements from the display; and a graphics rendering component operable to render the game elements on the user interface, each game element having a graphical representation, wherein the processor is configured to determine on detecting the match game condition if a game element with an additional function is to be provided in response thereto, the game element with the additional function being provided with one of the plurality of different characteristics.

In some embodiments, the game may have a plurality of different levels. At least one level may use only a subset of the plurality of different characteristics and the game element with an additional function is provided with one characteristic from the subset of a plurality of different characteristics.

Each of the different characteristics may be associated with a weight value which is used by the processor to determine which one of the plurality of different characteristics the game element with additional function is provided.

One of different characteristic comprises a combination of two or more of the different characteristics. In some embodiments, this combination may be a combination of all of the different characteristics.

In some embodiments, the game is a linker game and the processor is configured to provide the game element with an additional function at a location associated with a last game element linked to provide the match condition.

The additional function may comprise a so-called booster function.

The additional function may be obtained when the game element with an additional function in included in a match condition.

The characteristic may comprise colour.

A further aspect provides computer program products for implementing the afore-defined methods.

DESCRIPTION OF THE DRAWINGS

Embodiments of the invention will now be described by way of the accompanying drawings in which.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations without departing from the spirit or scope of the invention.

Figure 1:
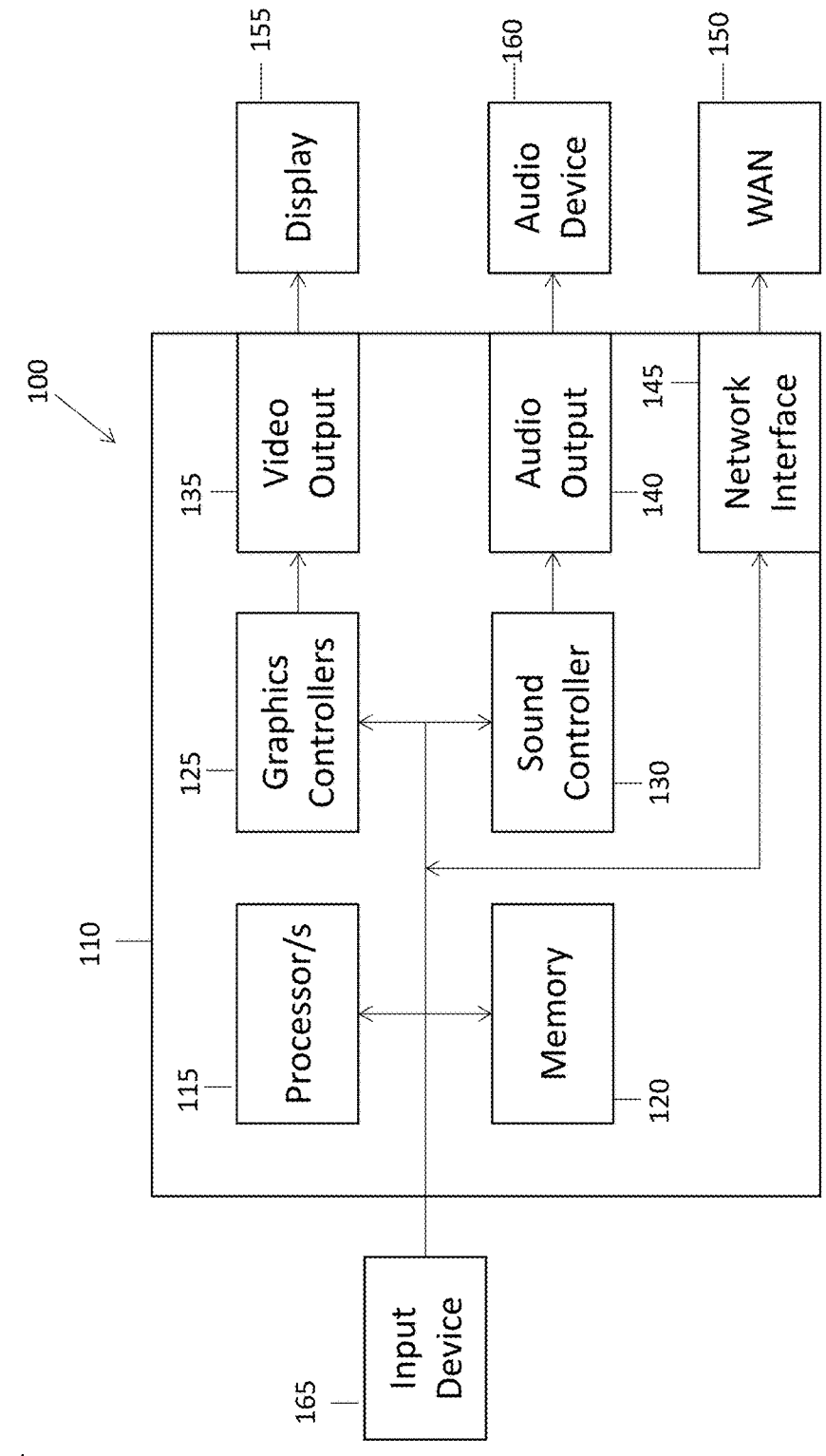
FIG. 1 shows an example user device in which some embodiments may be provided.

A schematic view of a user device 100 according to an embodiment is shown in FIG. 1. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
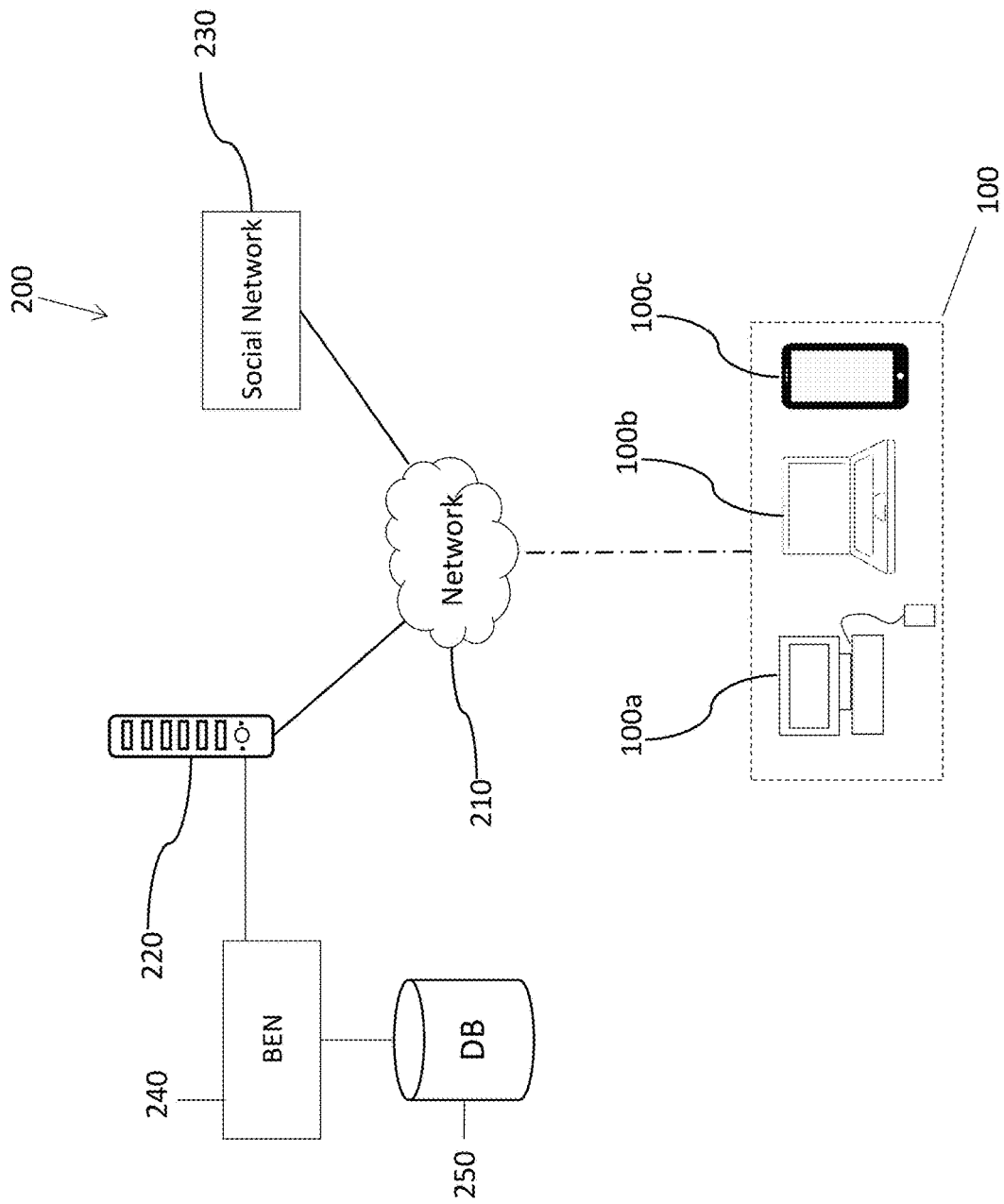
FIG. 2 shows an example system in which some embodiments may be provided.

FIG. 2 schematically shows a system 200 according to an embodiment. The system 200 comprises a server 220 which may store or be in communication with database 250 which may be, in some embodiments, be connected to a back end infrastructure (BEN) 240 of game player's details, profiles, statistics etc. In practice, one or more databases 250 may be provided. Where more than one server 220 is provided, the database(s) 250 may be provided in one database 250 or across two or more servers. The server 220 may also have a games data function. This may comprise one or more units of memory to store the computer game program, user behaviour data and a processor 115 to run the games program and process the user behaviour data.

Figure 13:
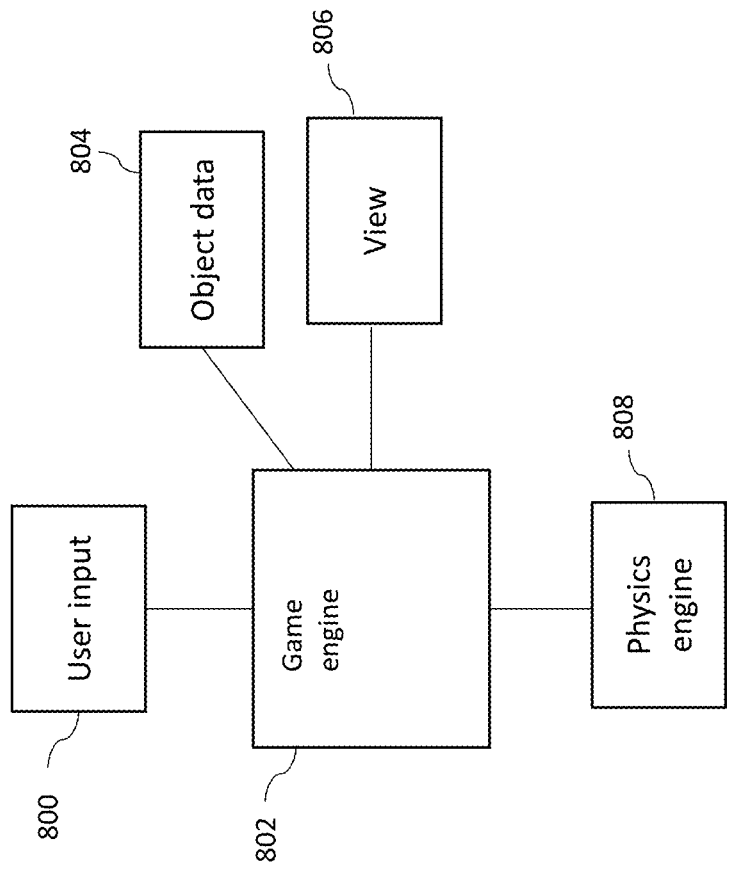
FIG. 13 is a schematic diagram showing the modules and functions associated with carrying out the operating of embodiments.

The server 220 may communicate via, for instance, the internet 210 to one or more client or user devices 100, shown in FIG. 13 by way of example as user devices 100*a*, 100*b* and 100*c*, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 320 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players 305. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 3:
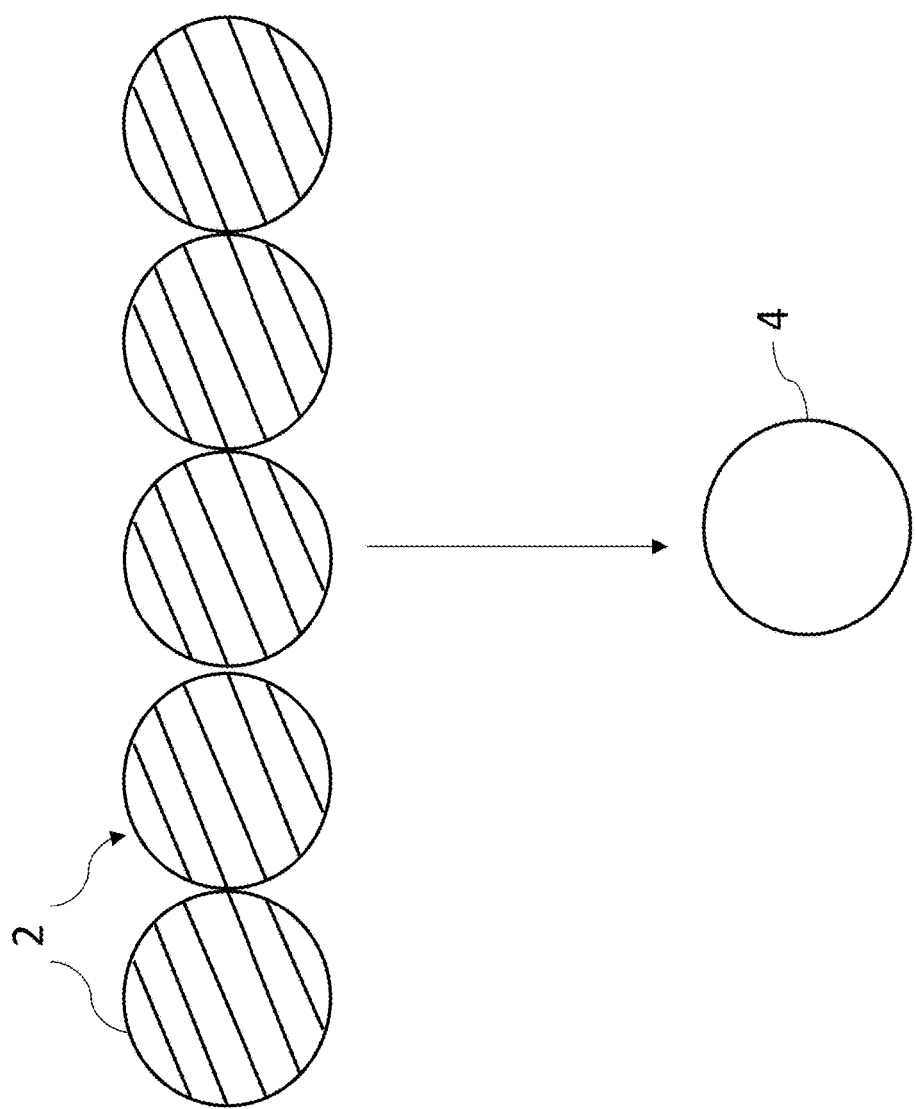
FIG. 3 shows schematically the linking mechanism of game elements to provide a further game element of some embodiments.

Reference is made to FIG. 3. As schematically shown in FIG. 3, five game elements 2 are shown. Each of those game elements share at least one common characteristic. The characteristic can be any suitable characteristic. The characteristic may for example be one or more of colour, shape, size, image provided on the game image of the like. In the following discussions, the common characteristic is colour. However it should appreciated that this is by way of example and any one or more suitable characteristics may be used to determine a match.

Different games may have different rules for determining whether or not a set of match condition game elements satisfy a match condition.

In the example shown in FIG. 3, the five game elements which have been selected, share the same characteristic and are considered to satisfy the match condition. These game elements will be removed and replaced by a single further game element 4. This further game elements is a so-called booster game element. In some embodiments, when a match is made using a booster game element, an additional effect is achieved so as to remove additional game elements.

The booster game element 4 may be provided with one of a plurality of different characteristics. In the example described, the characteristics are colour. In the game board, a number of different colours are used by different game elements. In some embodiments, the booster game element 4 can have any of the colours of any of the other game objects used in the game.

It should be appreciated that in some embodiments, a given booster element may be considered to have two or more of the characteristic. For example, where the characteristic is colour, the booster may be considered to be a so-called multicolour booster. This means that the multicolour booster can be used to successfully make a match with game elements of any of the characteristic. In the colour characteristic example, this means that the multicolour booster can be used to make a match with any other colour of game element.

Figure 8:
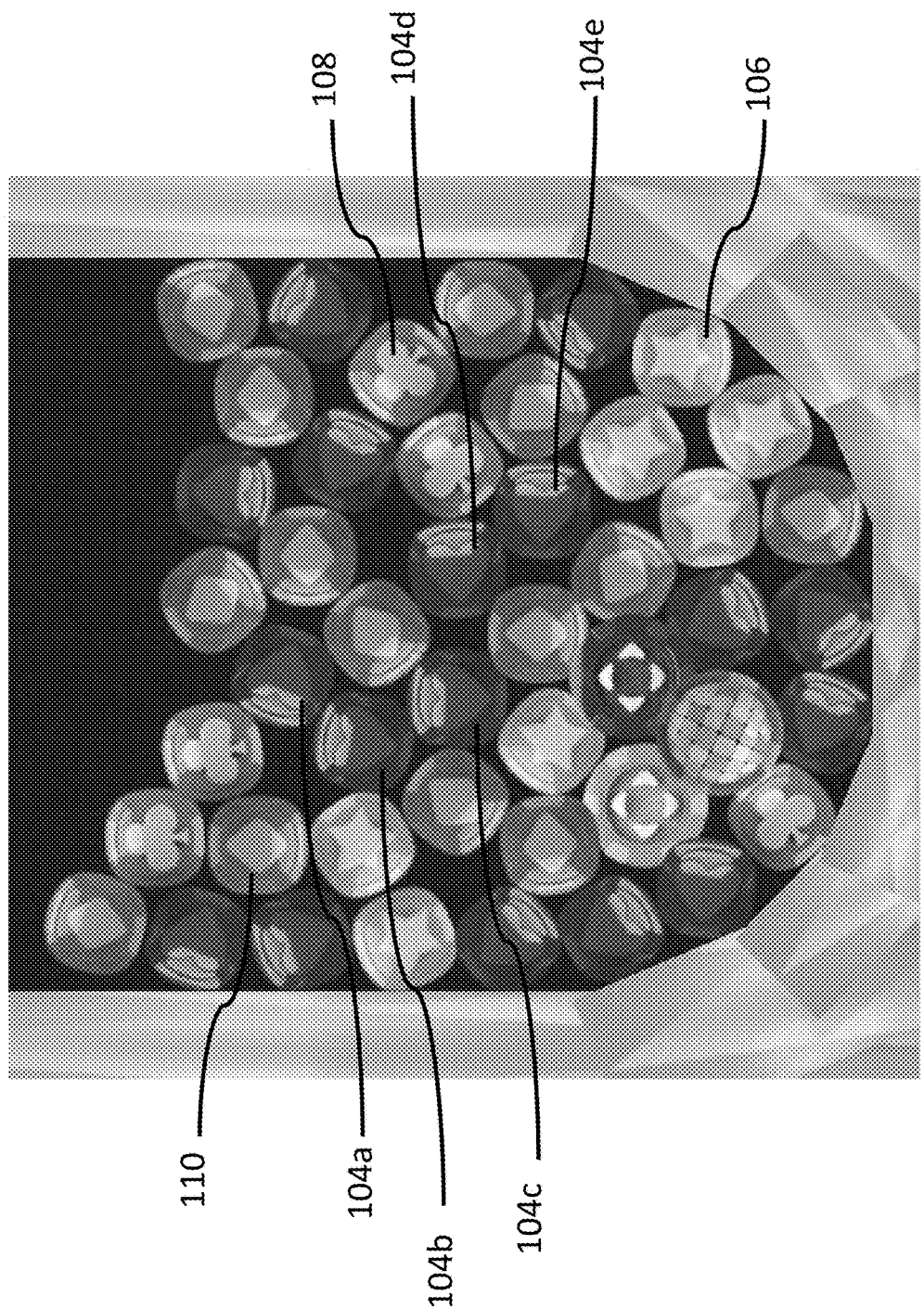
FIGS. 8 and 9 schematically show a game area at different times during a game mode, illustrating the generation of the booster game element.
Figure 9:
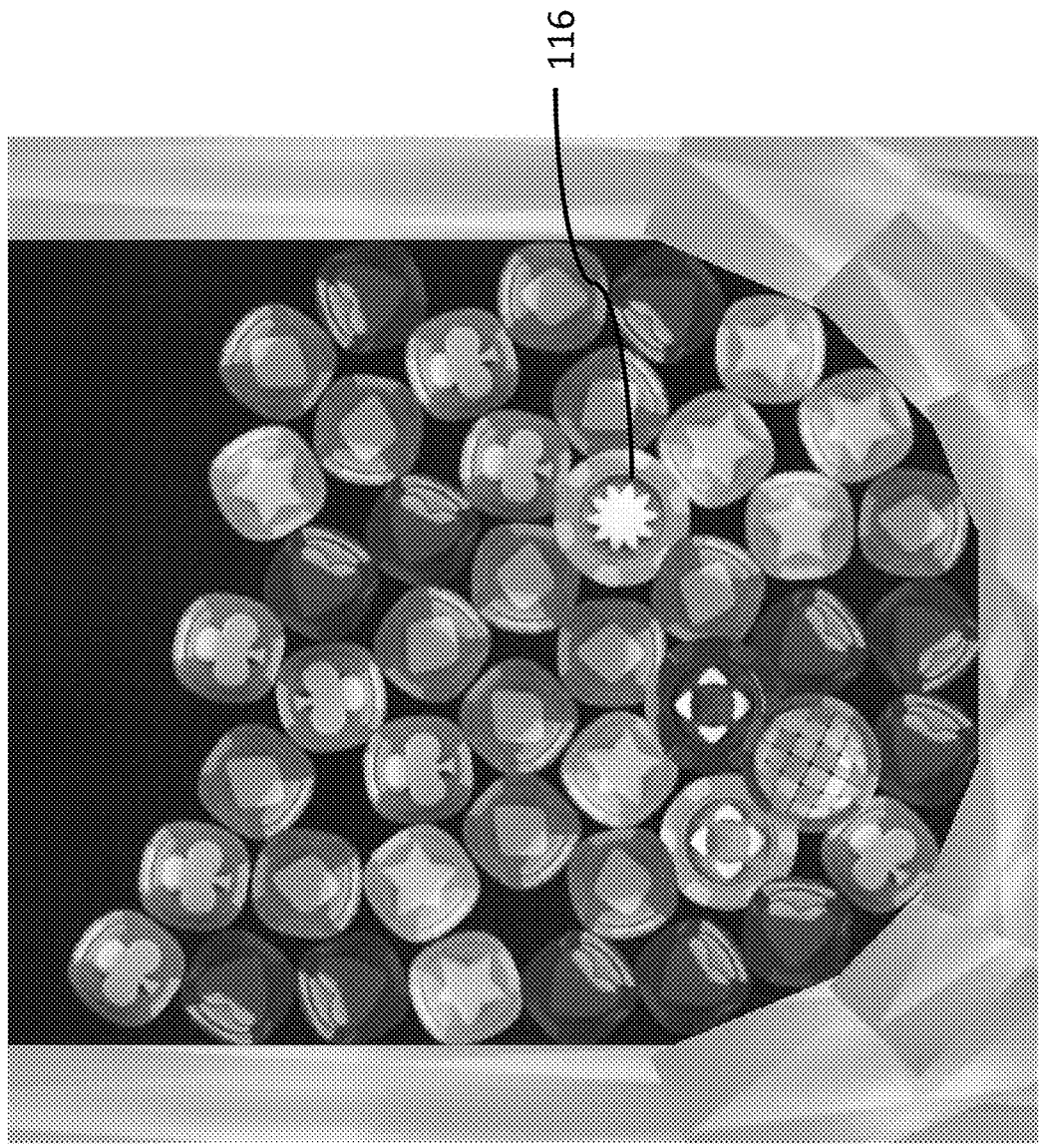

Reference is made to FIGS. 8 and 9 which show an example game area used in some embodiments. This game area is displayed on a display of a user device. The game elements, in the example shown in FIG. 8 have one of four different visual appearances. The game elements may be distinguished by their differing visual appearance. For example, different game elements have different colours. Additionally or alternatively, different game elements may be provided with different shapes. In the example shown, some game elements are provided with a star image 106, some game elements are provided with a club image 108, some game elements are provided with a diamond image 110 and some game elements 104 are provided with a heart image. Additionally, these different game elements may also have different colour characteristics.

The game elements in the displayed image of the example shown in the Figures have a seemingly random pattern and may for example simulate the arrangement of objects which have fallen into a container or the like. Movement of the objects may be controlled by a game engine in order to move downwardly to simulate the effects of gravity.

In the example shown, the game shown in FIGS. 8 and 9 may be a linker game. In other words, via the user input, the user selects a series of elements which are considered adjacent to one another to thereby form a chain. The selected game elements will have a same characteristic. In the example shown in FIG. 8, the user initially selects game element 104a, then object 104b, then game element 104c, and then game element 104d and finally game element 104e. In some embodiments, the game elements do not need to be touching in order to be considered adjacent. In some embodiments, if the distance between two game elements sharing the same characteristic is less than a threshold amount, then the two game elements can be linked together.

The mechanism for controlling the colour of the booster game element will be described in more detail in relation to FIG. 4 which shows a method which is performed by one or more processors in conjunction with one or more memories of the user device.

In step S1, it is determined if a match condition is satisfied. The check may be performed for example by a game engine. The game engine will determine if the selected game elements satisfy the required match condition. In the example described, the match condition will be that the game elements share a common characteristic, for example the same colour. The match condition may require a minimum number of game elements sharing the same characteristic to be selected. If it is determined that the match condition is satisfied, the game engine will update the data associated with the game elements such that the matched game elements are removed from the displayed image. The position of the last game element of the match is stored. In some embodiments, this will be the last selected game element of the selected game elements, for example game element 104e in the example of FIG. 8.

In step S2, a determination is made as to the number of game elements in the match. It should be appreciated that this may be part of the determining if a valid match is made, in some embodiments.

In step S3, it is determined if the number of game elements in the match is greater than n where n is an integer. The value of n may be any suitable value and in some in the example described is 5. However this is by way of example only and n may any other suitable value. In some embodiments, this may be performed at the same time that it is determined if there is a valid match condition.

If it is determined that the number of game objects in the match is less than n, then the next step is S7. This will cause the game objects to be rearranged. This is to take into account the fact that there may be a free area resulting from the removal of the matched game elements from the display. In some embodiments, the movement of the game objects may be controlled by a physics engine. For example, the physics engine may apply a gravitational condition such that game elements will fall or move from the upper part of the display to the lower part of the display, as if under the force of gravity. The image which is displayed will show the rearranged game elements. It should be appreciated that the game data associated with the respective game elements is updated to reflect their rearranged addition.

If it is determined that the number of game elements in the match is greater than n, then the next step is step S4. In step S4, a booster is selected in dependence on the number of game objects. In some embodiments, the booster which is selected will depend on the value of the number of game objects. In other embodiments, a booster may be selected regardless of the value of the number of the game objects in the match, so long as the value is greater than n.

In step S5, the colour or characteristic of the booster is selected. In some embodiments, the characteristic is selected based on the weighting associated with each value of the characteristic. The weightings may be the same or one or more characteristic may have a higher or lower weighting than others. In some embodiments, a level of a game may have a subset of the available characteristic values used. In these embodiments, only those used characteristic values may be selected for the booster.

The value of the booster characteristic may be selected at random in some embodiments. The weighting will however control the frequency with which a particular characteristic is selected. As discussed previously, one characteristic value may be to have two or more of the characteristic values (e.g. a multicolour value when the characteristic is colour).

By changing the value of the weights, the difficulty of a particular level can be controlled. This may be done in conjunction with controlling the number of game elements with a particular characteristic which are initially provided in the game area and/or which are used to refill the game area.

In step S6, the booster with the selected characteristic is displayed at the position of the last game object of the initial match. In this regard, reference is made to FIG. 9 which shows the booster 116 at the position of the last game element of the match of FIG. 8.

This is followed by step S7.

Figure 5:
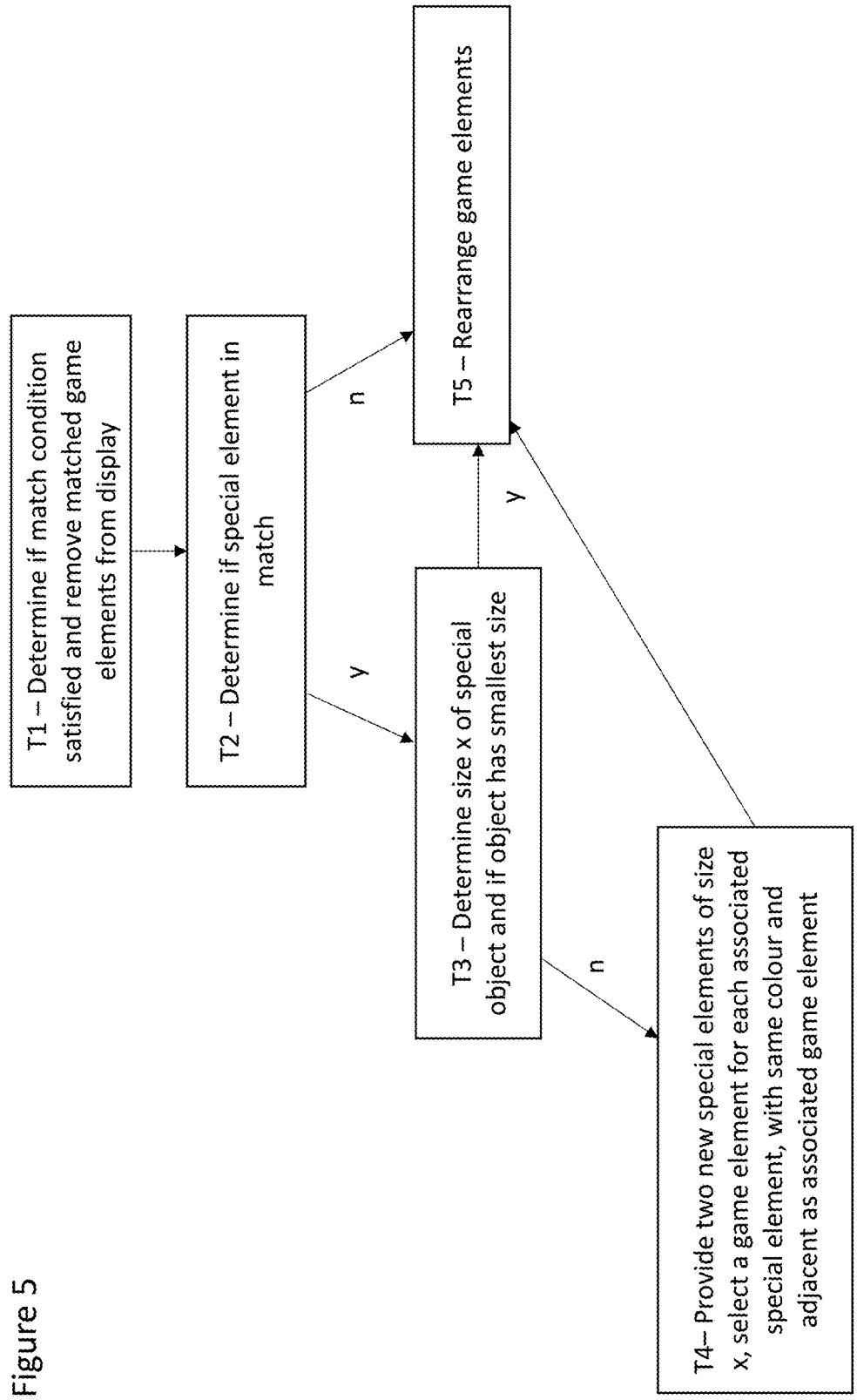
FIG. 5 is a second flow chart showing steps performed by a user device when a match is made with a special game element.

Reference is made to FIG. 5 which shows a method flow of an embodiment. This will be described in conjunction with game area shown in FIGS. 6 and 7. The game area is generally as discussed previously in relation to FIGS. 8 and 9.

In step T1, it is determined if a match condition is satisfied. If so, the removed matched game elements are removed from the display. In the example shown in FIG. 6, the matched game elements are a large round game element 100 (a so-called special game element) and the smaller game elements 104. The common characteristic shared by these game elements is, in some embodiments colour. As can be appreciated, these game elements may share for example one common characteristic but may differ in other characteristics.

In step of T2, it is determined if there is a special element in the match. In particular, it is determined whether the match includes a predefined element. In the example shown in FIG. 6, this predefined element is represented as a larger ball 100.

If it is determined that there is no special element in the match, then the game elements are rearranged, in step T5. In this regard, this may be as discussed in relation to FIG. 4 and step S7.

However, if it is determined that there is a special element in the match, then the next step is step T3. In the step T3, it is determined the size x of the special element. It is determined if the special element has the smallest size. In some embodiments, there may be two or more sizes of the special element. The different sizes of the element may be represented by a visual representation of the size.

If the special element has the smallest size, then there will be no further special elements associated with that special element and the next step is step T6.

Figure 6:
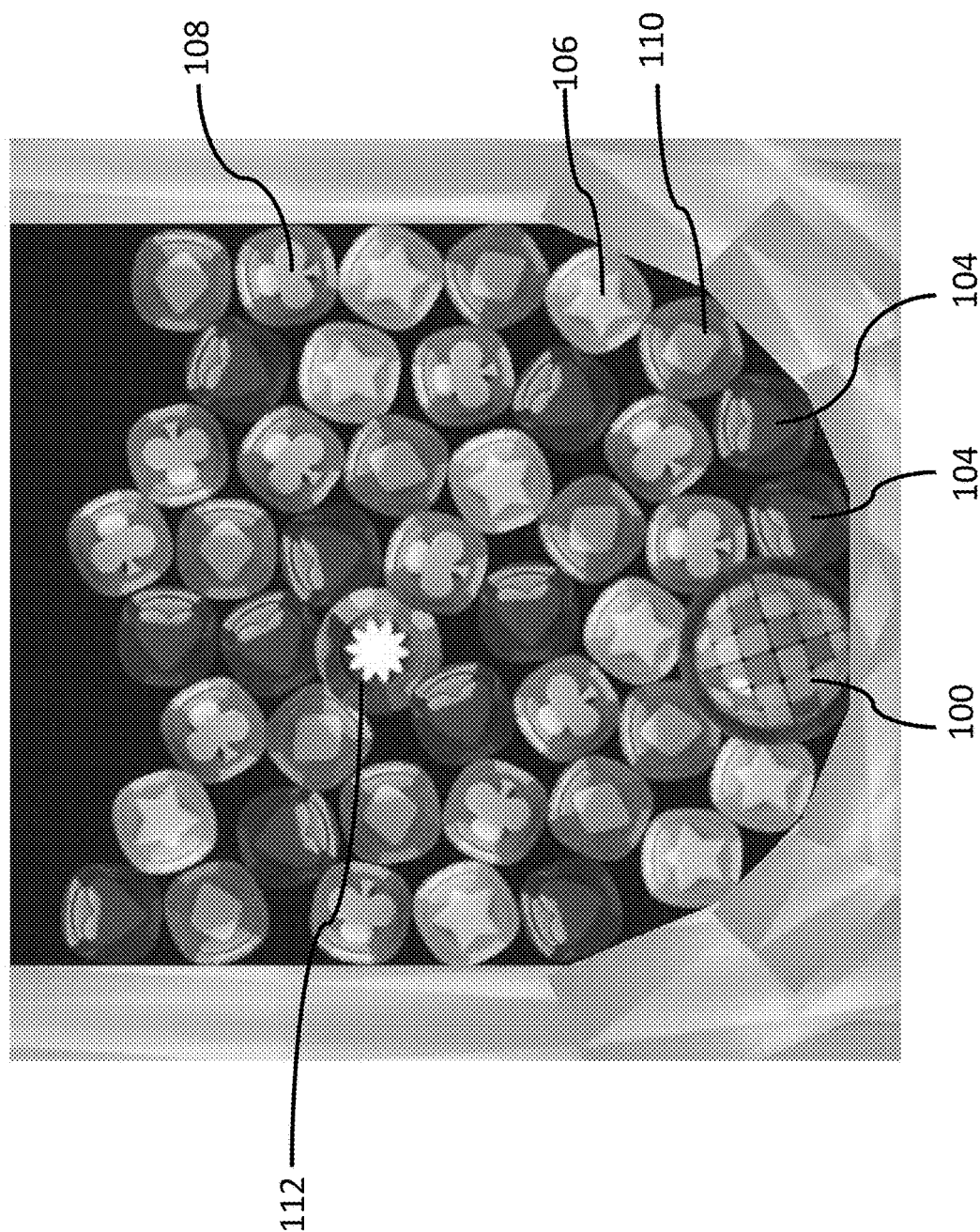
FIGS. 6 and 7 schematically show a game area at different times during a game, illustrating matching of a special game element.

In the example shown in FIG. 6, the special element 100 has the size greater than the smallest size. If it is determined in step T3 that the size of the special element is not the smallest size, then the step next step is step T4.

In step T4, two new special elements of the size −1 are provided. Each of the smaller special elements has another game element on the game area elected to be associated with the respective special element. The smaller game element will then be placed on the game board adjacent the associated game element and the characteristic of the special element will be that of the associated game element.

In some embodiments, the two smaller special game elements are selected such that they have different characteristics (e.g. colour) as compared to the larger special game element.

Figure 7:
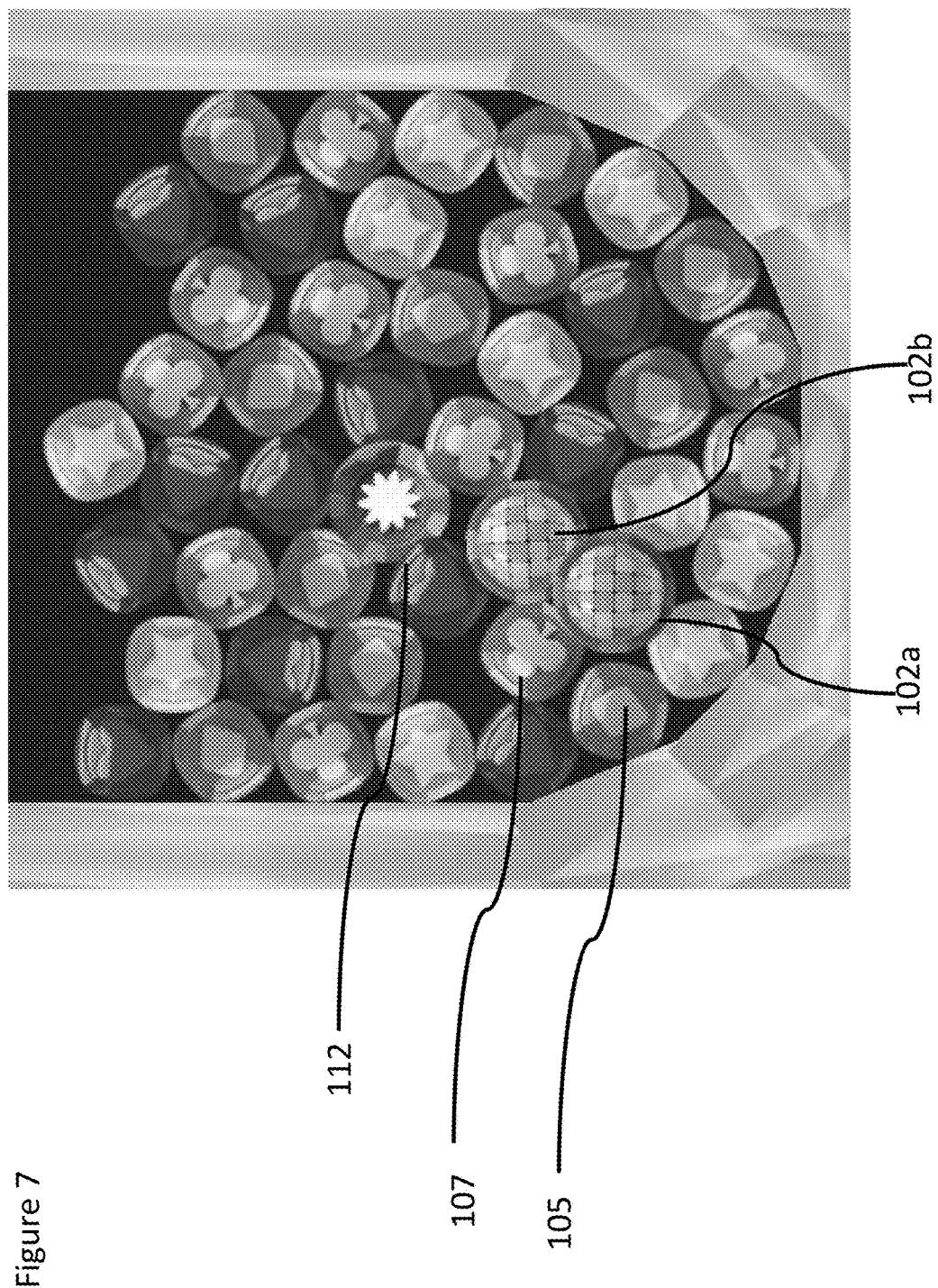

As can be seen in FIG. 7, the smaller special game elements are referenced 102a and 102b. The smaller special game element 102a is associated with the game element 105 and is positioned adjacent thereto and has the same characteristic as that game element 105. The smaller special game element 102b is associated with the game element 107 and is positioned adjacent thereto and has the same characteristic as that game element 107.

It should be appreciated that in the example shown, there is a larger size of a special element and a smaller size of a special element. In other embodiments, there may be more than two different sizes of the special element. For example, in some embodiments, there may be three or more different sizes of the special element.

In the described example, the special element is described as dividing into two smaller special elements. It should be appreciated that in other embodiments, the larger element may alternatively split into three or more smaller elements.

In the described embodiment, the smaller elements are described as having a different characteristic to the larger element. It should be appreciated that in some embodiments one or more of the smaller elements may have the same characteristic at the larger element.

In the described embodiment, the two smaller elements are described as having different characteristics from each other. It should be appreciated that in other embodiments, it is possible for the two smaller elements to share the same characteristic.

In some embodiments, a weighting may be provided in order to select the required characteristic of the smaller element. Accordingly, some values associated with a characteristic may occur more frequently than others.

In the example described, the smaller elements are described as being associated with another game element and taking their position and characteristic from that other game element. It should be appreciated that in other embodiments, a different mechanism may be used in order to control the position and/or characteristic of the smaller game elements.

Figure 4:
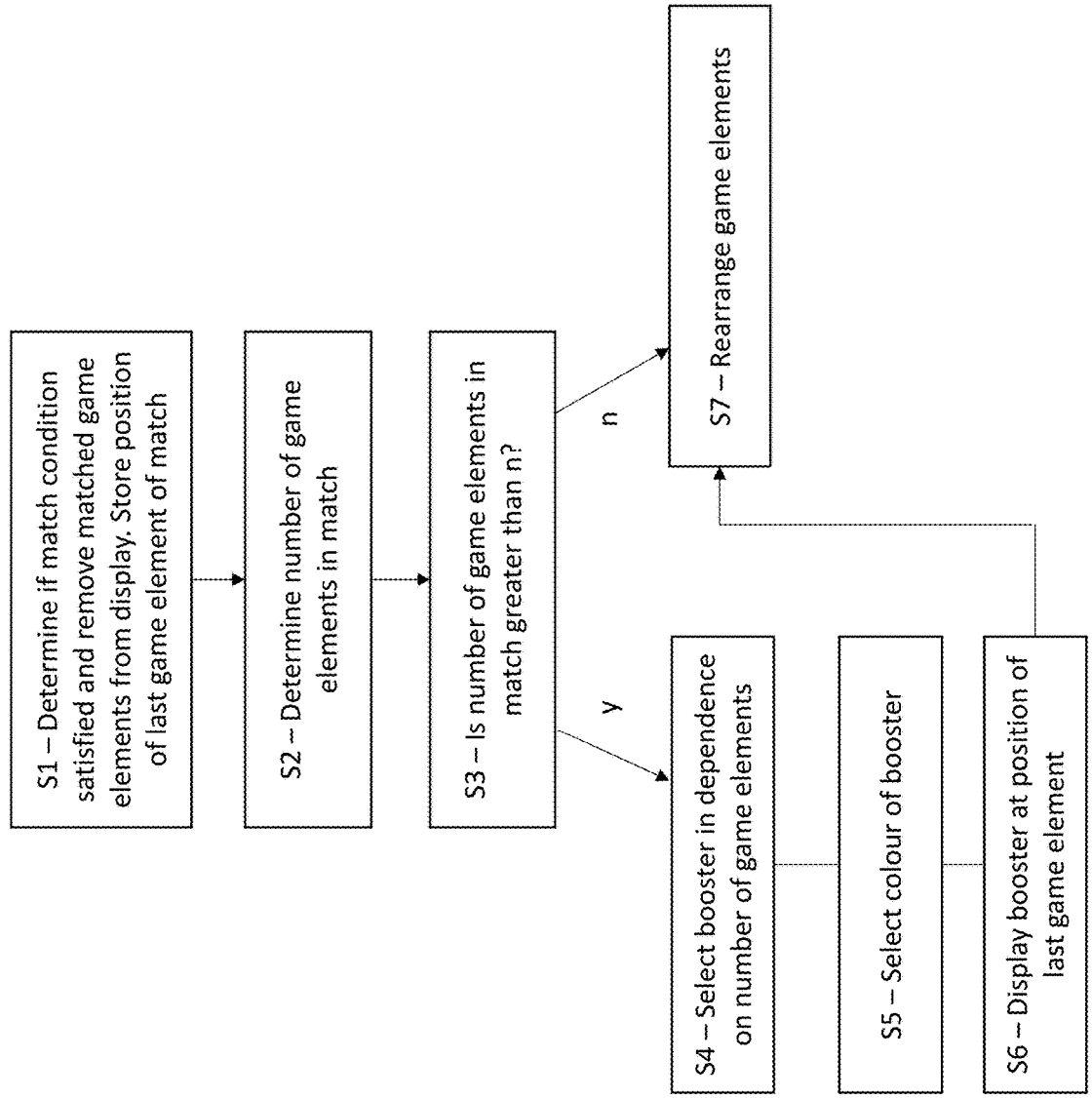
FIG. 4 is a first flow chart showing steps performed by a user device when a match is made to produce a booster game element.

It should be appreciated that the embodiments shown in FIGS. 4 and 5 may be used in a same game.

Figure 10:
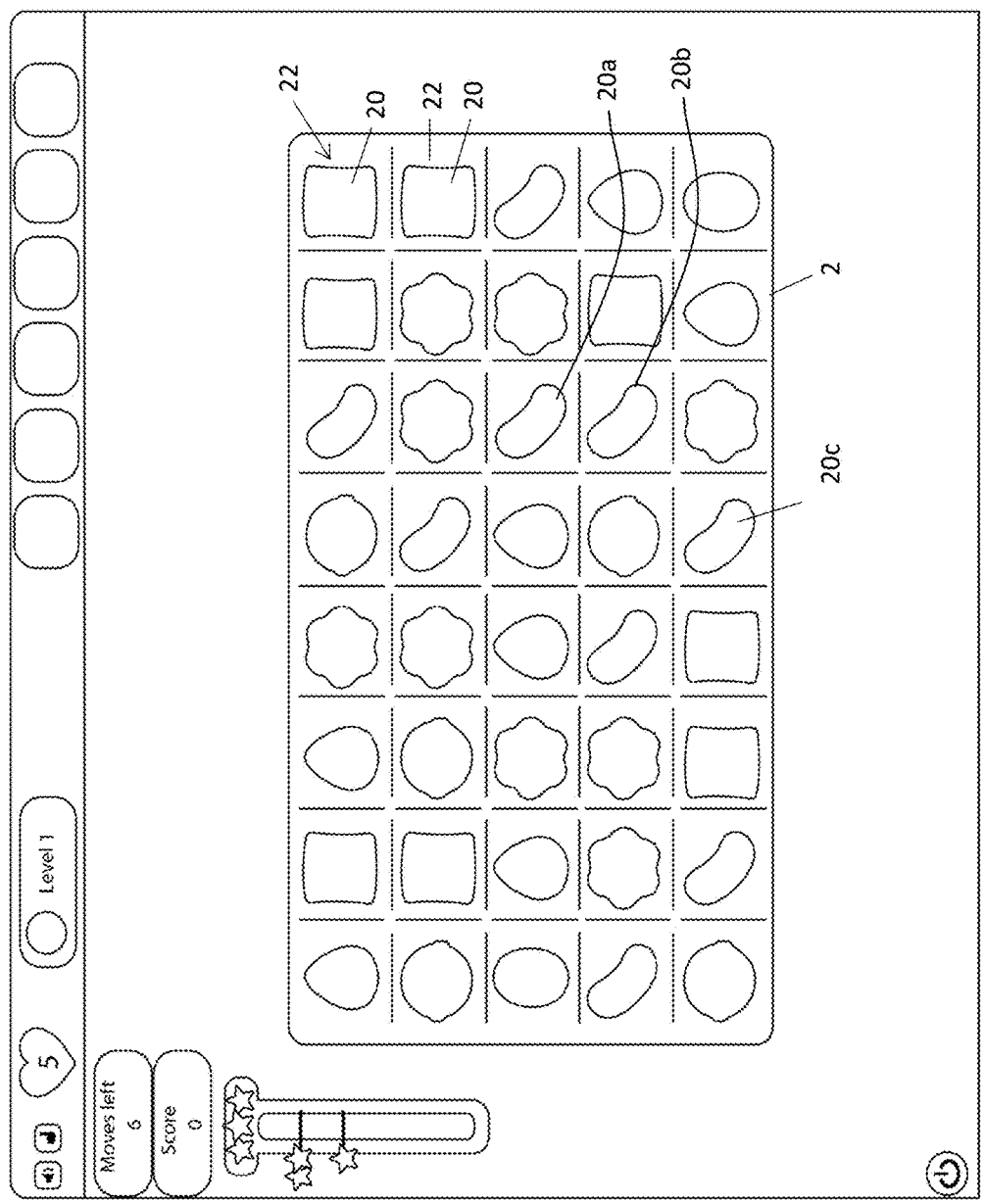
FIG. 10 is a schematic diagram of a game board of a match three game illustrating a basic example of a switch match three game.
Figure 11:
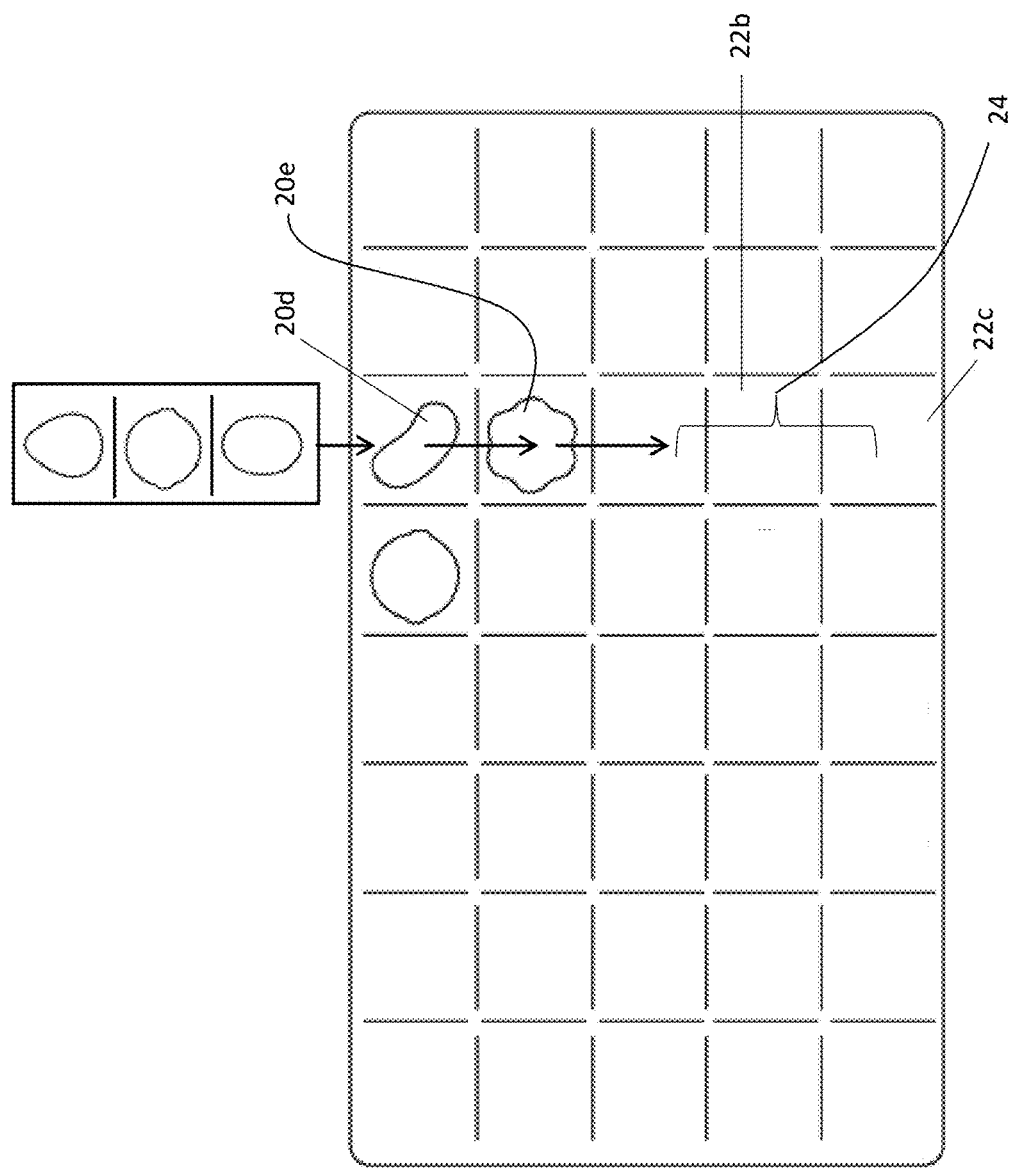
FIG. 11 is a schematic diagram illustrating how a game board is repopulated with replacement game elements in the example of FIG. 10.

FIG. 10 shows a display of a known version of a match 3 switcher game called Candy Crush Saga™. FIG. 1 illustrates a game board 2 with a plurality of game elements 20. The game elements are each of six different shapes and colours. Each game element is supported by a tile 22.

Figure 12:
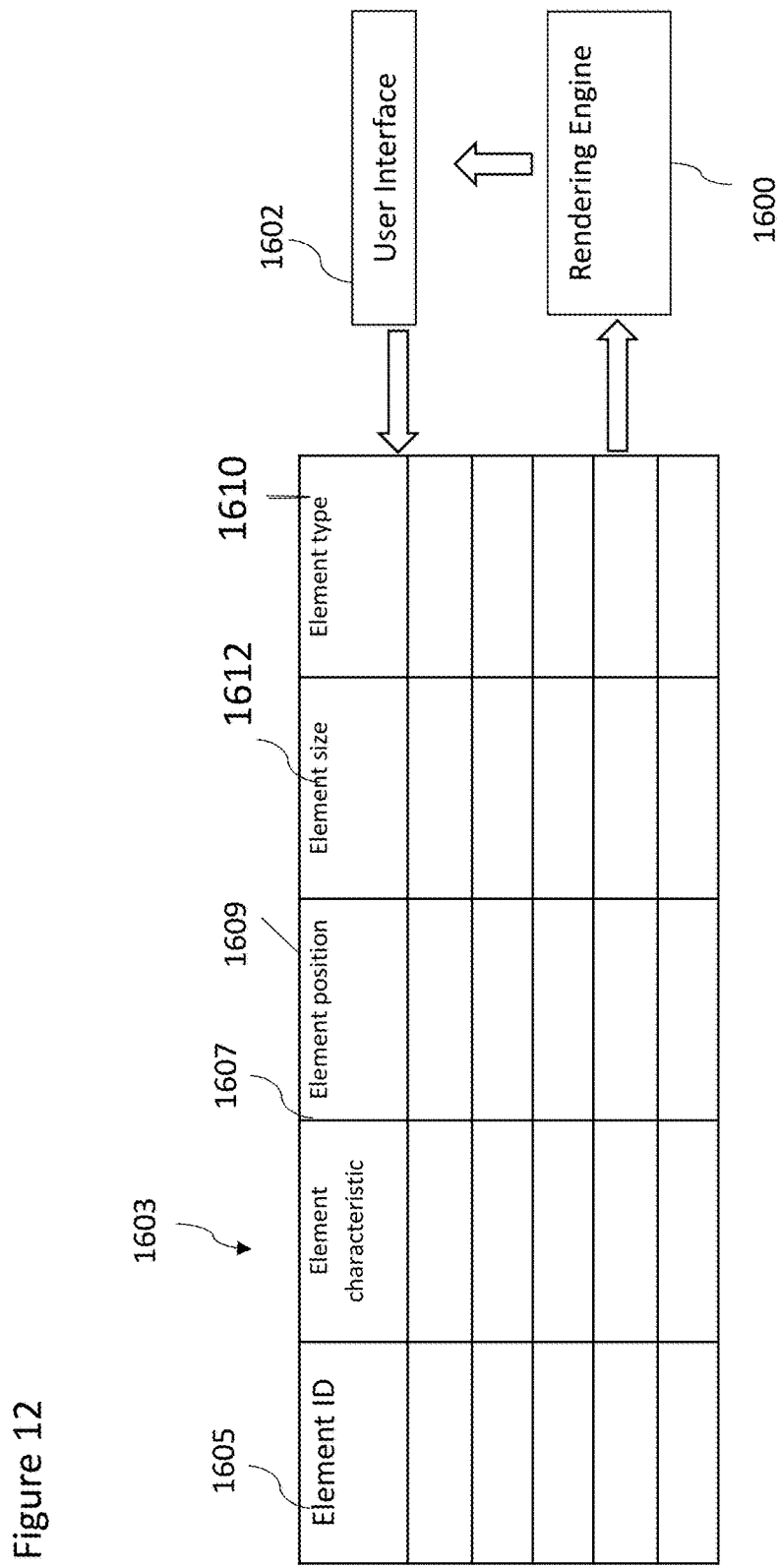
FIG. 12 schematically shows a data structure for managing tile data, showing the interrelation between the data structure and a rendering engine of a graphics controller.

In the known version of the match 3 switcher game, the aim of the game is to swop game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 1 that game element 20c is moved one place to the right to form a three-line match with game elements 20a and 20b. Turning now to FIG. 12, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

It will be understood that in this game, each tile has a game board position, but game elements are removed and replaced over the tiles This game may be modified to provide the booster, such as described previously.

This game may be modified to have the special game element such as described previously.

The steps shown in FIG. 4 and/or FIG. 5 may be carried out in the order shown or in any other order. In some embodiments, at least one step may be performed in parallel.

FIG. 12 illustrates a data structure for managing the tile background appearance, and schematically illustrates the interrelation between the data structure 1603 and a rendering engine 1600 of the graphics controller 180. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 1603 is responsible for controlling the game area displayed. Each game element has an ID 1605. Each ID 1605 is associated with element characteristic data 1607 which defines what characteristic the game element has associated with it. This may be for example the colour associated with a game element. Each ID is also associated with element position data 1609 which defines the position on the user interface where the game element is to be positioned. This allows the rendering engine 1600 to generate that game element at an appropriate position on the user interface display 1602. Each ID is associated with element type data 1610 which defines what type of element is associated with the ID: for example normal game element, booster or special game element. For special game elements, size data 1612 is also provided.

It should be appreciated, that in some embodiments, the size data may be combined with the type of element data.

After a move has been made or there has been some change to the game are the game engine will update this data such that updated game element image will be rendered by the rendering engine and displayed.

Reference is made to FIG. 13 which schematically shows the functional blocks of an embodiment, which may enable game play such as discussed previously. A user input block 800 is shown. This captures the user input and feeds the input to a game engine 802. In the context of the game of some embodiments, this user input may be which game elements are linked by a user. This user input can be via any suitable user interface, such as discussed earlier.

The game engine 802 will process the information provided by the user input. The game engine 802 (for example a game model) will determine if a valid combination has been made.

Each game element has object data associated therewith. The object data 804 may be stored in any suitable memory location. In some embodiments, the object data may be provided by the data structure described previously. In some embodiments, the object data may be considered to be part of the game engine and in other embodiments may be considered to be outside the game engine. The object data may provide information as to the properties of a game element. These properties can include attribute information such as colour and/or whether or not a game element has a particular function such as a so-called booster function and/or whether the game element is a so-called special game element. The ata may include the position data, that is, information representing the position of the game element in the displayed image.

In some embodiments, the game engine will check if the game element satisfies the rule or rules for a valid match. The rule or rules which define whether or not a match condition has been satisfied. The match condition will be dependent on the game. In some embodiments, a match condition will be satisfied if the game elements are arranged to provide a sequence of at least three adjacent game elements sharing at least one same characteristic. In some embodiments, the game elements of the sequence are removed.

Thus, the game engine will be in control of the matching mechanism. The game engine will have access to data for each game element including its position and the at least one characteristic associated with the game element and will be able to determine if a match condition has been met. If a match condition is met, the game elements in the match may be removed.

It should be appreciated that in other embodiments, the game may use any type of match mechanic such as switching, sliding or linking. The game elements may be any suitable game element.

A physics engine 808 is provided which is configured to control the movement of moving game elements on the display. This may in some embodiments to simulate the effect of gravity.

The physics engine 808 may be part of the game engine 802.

A view function 806 uses of the object data to provide the displayed image with which the user is able to view and/or interact.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device comprising:
   a touchscreen configured to display a plurality of game elements, wherein at least one of the plurality of game elements is selectable by a user;
   a graphics rendering component configured to render the plurality of game elements for display on the touchscreen, each game element having a graphical representation;

the touchscreen configured to detect user input, said user input comprising selection of a plurality of game elements displayed by the touchscreen by touching the respective game elements;

at least one processor configured to receive the user input detected by the touchscreen, said at least one processor being configured to determine a match game condition for the plurality of game elements, and on determining that the plurality of game elements satisfies the match game condition, the at least one processor is configured to control the touchscreen to remove the plurality of game elements satisfying the match game condition from the touchscreen; and wherein the at least one processor is configured to determine if at least one of the user selectable game elements satisfying the match game condition is of a first type and of a first size and if so to cause the touchscreen to display at least two further user selectable game elements of the first type, the at least two further user selectable game elements having a second size which is smaller than the first size, said touchscreen being configured to display a plurality of game elements including the at least two further user selectable game elements for subsequent selection by the user.

2. The computer device of claim 1, wherein the at least one processor is configured to determine a match condition if the match condition game elements have at least one characteristic in common.

3. The computer device of claim 1, wherein the at least one processor is configured to provide the two further game elements with a different characteristic to a characteristic of the at least one game element of the first type in the match game condition.

4. The computer device of claim 1 wherein the at least one processor is configured to provide the two further game elements with a different characteristic to each other.

5. The computer device of claim 1, wherein the at least one processor is configured to select for each of the further game elements an associated game element displayed on the interface and to control a respective further element to be positioned adjacent the respective associated game element.

6. The computer device of claim 1, wherein the at least one processor is configured to select for each of the further game elements an associated game element displayed on the interface and to control a respective further game element to have the same characteristic as the respective associated game element.

7. The computer device of claim 1, comprising a memory configured to store size information associated with each game element of a first type, the size information comprising one of a plurality of different sizes.

8. The computer device of claim 7, wherein the size information comprises one of three different sizes.

9. The computer device of claim 7, wherein the at least one processor is further configured to determine a size of at least one game element of the first type in a subsequent match game condition, and if the size is a smallest size, no further game elements of the first type are provided in response thereto.

10. A computer implemented method of controlling a touchscreen, said touchscreen providing a user interface responsive to user engagement with displayed game elements on the touchscreen interface, the method comprising the following steps implemented by a computer device:

displaying on the touchscreen a plurality of game elements, wherein at least one of the plurality of game elements is selectable by a user;

rendering by a graphics rendering component the plurality of game elements for display on the touchscreen, each game element having a graphical representation;

detecting user input using the touchscreen, the said user input comprising selection of a plurality of game elements displayed by the touchscreen by touching the respective game elements;

detecting by at least one processor, in response to the detected user input, a match game condition for the plurality of game elements and on determining that the plurality of game elements satisfies the match game condition, controlling the at least the touchscreen to remove the plurality of game elements satisfying the match game condition from the touchscreen;

on detecting the match game condition, determining if at least one of the match condition game element in the match game condition is of a first type and of a first size, if so to providing at least two further user selectable game elements of the first type, the at least two further game elements having a second size which is smaller than the first type; and displaying on said touchscreen a plurality of game elements including the at least two further user selectable game elements for subsequent selection by the user.

11. The method of claim 10, comprising determining a match condition if the match condition game elements have at least one characteristic in common.

12. The method of claim 10, comprising providing the two further game elements with a different characteristic to a characteristic of the at least one game element of the first type in the match game condition.

13. The method of claim 10, comprising providing the two further game elements with a different characteristic to each other.

14. The method of claim 10, comprising selecting for each of the further game elements an associated game element displayed on the interface and controlling a respective further element to be positioned adjacent the respective associated game element.

15. The method of claim 10, comprising selecting for each of the further game elements an associated game element displayed on the interface and controlling a respective further game element to have the same characteristic as the respective associated game element.

16. The method of claim 10, comprising storing size information associated with each game element of a first type, the size information comprising one of a plurality of different sizes.

17. The method of claim 16, wherein the size information comprises one of three different sizes.

18. The method of claim 16, further comprising determining a size of at least one game element of the first type in a subsequent match game condition and if the size is a smallest size, providing no further game elements of the first type in response thereto.

19. A non-transitory computer program product for controlling touchscreen of a computer device, said touchscreen providing a user interface responsive to user engagement with displayed game elements on the touchscreen interface, the computer program product comprising code embodied on a computer-readable medium and being configured so as when executed on at least one processor of the computer device to:

cause displaying on the touchscreen a plurality of game elements, wherein at least one of the plurality of game elements is selectable by a user;

render the plurality of game elements for display on the touchscreen, each game element having a graphical representation;

cause detecting user input using the touchscreen, the said user input comprising selection of a plurality of game elements displayed by the touchscreen by touching the respective game elements;

detect in response to the detected user input, a match game condition for the plurality of game elements, and on determining that the plurality of game elements satisfies the match game condition, controlling the at least the touchscreen to remove the plurality of game elements satisfying the match game condition from the touchscreen;

on detecting the match game condition, determine if at least one of the match condition game element in the match game condition is of a first type and of a first size, if so to providing at least two further user selectable game elements of the first type, the at least two further game elements having a second size which is smaller than the first type; and cause displaying on said touchscreen a plurality of game elements including the at lest two further user selectable game elements for subsequent selection by the user.

* * * * *